April 12, 1966 JITSUE IIDA 3,245,627

TAPE RECORDER

Filed June 21, 1963 2 Sheets-Sheet 1

INVENTOR

JITSUE IIDA

BY Wenderoth, Lind & Ponack

ATTORNEYS

INVENTOR
JITSUE IIDA
BY Wenderoth, Lind & Ponack
ATTORNEYS

United States Patent Office 3,245,627

Patented Apr. 12, 1966

3,245,627
TAPE RECORDER

Jitsue Iida, Tokyo, Japan, assignor of one-third to Eiraku Denki Kabushiki Kaisha, Tokyo, Japan
Filed June 21, 1963, Ser. No. 289,676
3 Claims. (Cl. 242—55.12)

The present invention relates to an improvement in a tape recorder, disclosed in patent application Serial No. 249,931 now U.S. Patent 3,161,361.

Although the tape recorder disclosed in said patent application is miniaturized due to its unique mechanism, there are problems with the rewinding operation etc.

With respect to the apparatus disclosed in the said patent application, in order to rewind by means of a rewinding capstan at the periphery of the supply reel, it is necessary to speed up the velocity of the rewinding capstan because of the otherwise gradually reduced rewinding velocity.

Further, since the rewinding capstan must be pressed against the periphery of the tape on the supply reel, the pressure thereof makes the pressure between the periphery of the tape and the driving capstan unnecessarily great, with the result that the friction at the bearing of the driving capstan becomes great. Consequently it is necessary to supply a rather high driving power to the periphery of the tape in order to reverse the rotation of the takeup reel through the tape which has not been taken up on the winding reel. Accordingly, considerable power is needed for rewinding the tape by a rewinding capstan in view of the aforementioned problem of the rotating velocity.

In this case, if the driving capstan is changed over positively by a motor etc. at the same time the rewinding capstan is rotated in a direction for rewinding the tape, it is easy to rewind the tape. However, in order to prevent the loosening of the unwound tape, the tape rewinding velocity of the rewinding capstan must be greater than the tape drawing out velocity of the driving capstan, and the rewinding capstan must be driven while it is in slipping engagement with the periphery of the tape on the supply reel. The chief reason for this is that since the axle portion of the supply reel is not fixed but movable, it is difficult to supply the rotating power for rewinding to the axle portion of the supply reel.

In addition, a spring fixed to a reel carrying frame and a roller or a pad fixed to one end of the spring are, as explained in the above-mentioned application, provided for preventing loosening of the peripheral turn of the tape on the reels during the winding and supplying tape from the reels by giving a suitable frictional braking effect to the supply reel while it is being driven.

In order not to cause a loosening of the peripheral turns of tape on the takeup and supply reels, the stronger the spring is, the better the result is. However, because of the frictional brake, it is difficult to drive the tape if the spring is too powerful; and thus these two conditions conflict with each other.

Further, the fact that the spring is positioned as shown in the drawings of the earlier application, necessitates pressure of the fingers to be applied to the spring when the takeup and supply reels are inserted or removed from the tape recorder. Therefore, the spring is liable to be deformed. Consequently, the contact pressure with the tape on the takeup and supply reels changes unsuitably. Further the existence of the spring is undesirable because of its appearance.

This invention overcomes the above-mentioned defects and a detailed explanation will be hereinafter in connection with the embodiments as shown in the drawings, in which FIG. 1 is a plan view of a tape recorder of the present invention;

Figure 1:
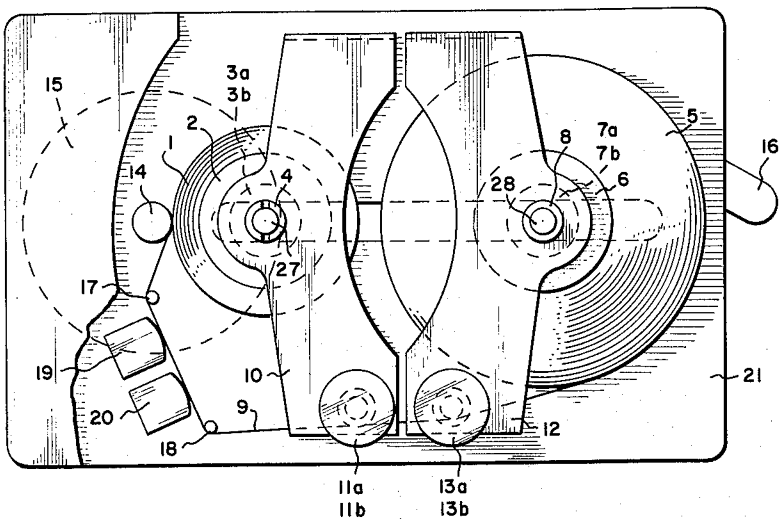

Referring to FIG. 1, two reel carrying frames 10 and 12 are shown. The frame 10 carrying tape roll 1 is the takeup side and the frame 12 carrying tape roll 5 is the supply side. Hereinafter, these terms are used even when talking about rewinding.

On the winding side, the tape 1 is wound on a takeup reel 2, and intermediate friction disc spacers **3*a* and 3*b* prevent the tape 1 and the takeup reel 2 from touching the reel carrying frame 10. A hollow axle 4 fixed to the takeup reel 2 is freely rotatable on a bearing axle 27** which does not rotate.

Figure 2:
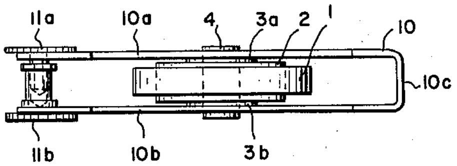
FIG. 2 is a side view of a portion of the reel carrying frame shown in FIG. 1.

FIG. 2 is a side view of a reel carrying frame 10 which is detached from the axle 27. In this case, the axle 4 is integral with the takeup reel 2 and is freely rotatable within reel carrying frame 10. Numerals **11*a* and 11*b* designate adjustable spacing means which change the spacing between the parallel side plates 10*a* and 10*b* of the reel carrying frame 10 and thereby change the power of a frictional brake against the rotation of the reel 2**.

A loosening of the peripheral turn or turns of the tape is inconvenient during handling of the tape 1 and tape 5 yet it can occur due to the fact that the tape rolls 1 and 5 are rotatable relative to the reel carrying frames 10 and 12 respectively. Therefore, the tape rolls 1 and 5 are given a frictional brake so that they cannot be rotated by a small force.

As shown in FIG. 2, the adjustable spacing means **11*a* and 11*b* have a male screw of suitable diameter and pitch and a female screw respectively and engaged with each other and are rotatably mounted in opposite plates of the reel carrying frame 10. The side plates are connected by a connecting frame member 10*c*** so that they tend to spread outwardly.

Accordingly, when one of the adjustable spacing means **11*a* or 11*b* rotates to move the male screw into the female screw, the space between the side plates of the reel carrying frame 10 becomes smaller. Consequently the takeup reel 2 and the tape 1 are frictionally braked through the intermediate discs 3*a* and 3*b*, and they cannot rotate relative to the reel carrying frame 10** with a small force; thus the handling of the tape is made convenient.

In driving a tape, the tape roll 1 is made freely rotatable within the reel carrying frame 10 by rotating adjustable spacing means in the opposite direction to that described above, i.e. by loosening them. The tape roll 5 and the reel carrying frame 12 shown in FIG. 1 have the adjustable spacing means **13*a*, 13*b* therefor adjusted so that a suitable frictional braking effect is given to the tape roll 5**.

As shown in FIG. 1, since the opposed parts of the reel carrying frames 10 and 12 are not circular, the tape rolls 1 and 5 can be easily fixed to or removed from the axles 27 and 28 regardless of the diameter thereof.

Incidentally, the adjustable spacing means parts **11*b* and 13*b*** (the female screw portions) serve as tape guides.

In the embodiment of FIGS. 1 and 2, the adjustable spacing means are provided with screw threads. However, many methods can be adopted in order to change the spacing between the side plates of the reel carrying frames 10 and 12.

Figure 3:
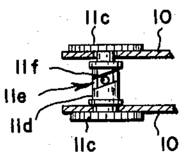
FIG. 3 is a side view of another embodiment of a space-adjusting means for the frame members.

FIG. 3 is a view view of another embodiment of an adjustable spacing means, taken from the side toward the tape roll 1.

In FIG. 2, the adjustable spacing means 11*a* and 11*b* have a separate male screw and female screw respectively. However, the adjustable spacing means 11*c* in FIG. 3 is made in one piece without a screw and its axle is inserted rotatably into a cylindrical tape guide 11*d* corresponding to the tape guide of 11*b* in FIG. 2.

The tape guide 11*d* is fixed to only one of the side plates of the reel carrying frame 10 and has a suitably inclined groove 11*e* on the side opposite to the side over which the tape passes, and a pin 11*f* on an axle of the part 11*c* of the adjustable spacing means is positioned in the groove 11*e*.

Accordingly, the space between the side plates of the reel carrying frame 10 can be adjusted by rotating the part 11*c* through a definite angle about its axis and it is possible to indicate the necessary amount of rotation for the desired spacing by marks on the reel carrying frame 10.

The tape roll 5, the winding reel 6, the friction discs 7*a* and 7*b*, the axle 8, the reel carrying frame 12 and the adjustable spacing means 13*a* and 13*b* on the supply side correspond to like parts on the takeup side, except that axle 28 is fixed to the axle 8 for a purpose to be explained later.

With reference to FIG. 1, since the tape roll 1 is always suitably pressed by the capstan 14 during recording or reproducing driving, a tape part 9 drawn off the tape roll 5 is wound on the tape roll 1 past an erasing head 20 and a recording and reproducing head 19 by rotation of the capstan 14. Numerals 17 and 18 designate tape guides; numeral 15 designates the flywheel of the capstan 14; numeral 21 designates a base plate; and numeral 16 designates a control lever. The control lever 16 will be described more fully later.

Figure 4:
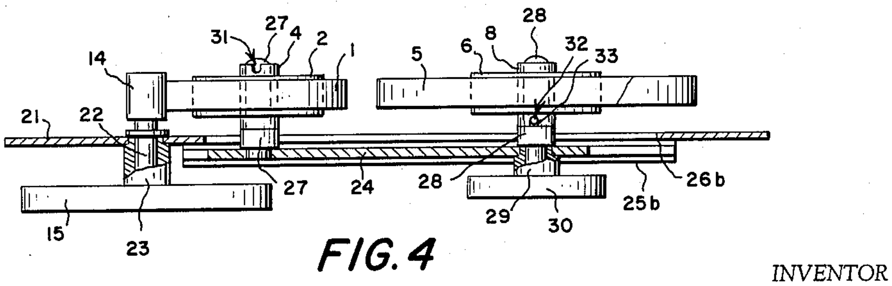
FIG. 4 is a side view, partly in section, of a tape recorder shown in FIG. 1.

FIG. 4 is a side view showing the relation between the capstan 14, the tape rolls 1 and 5 and the axles 27 and 28 etc. together with part of the mechanism beneath plate 14. However the reel carrying frames 10 and 12 etc. are not shown. Numeral 23 designates a bearing in which an axle 22 of the capstan 14 and the flywheel 15 is freely rotatably mounted, and it is fixed to the base plate 21. The axle 27 has a seat thereon to support the axle 4 and is fixed to a sliding plate 24.

The axle 28 has a seat to support the hollow axle 8 and is freely rotatably mounted in a bearing 29 fixed to the sliding plate 24 and is fixed to a pulley 30 for rewinding 30. A pin 33 provided on the axle 28 is positioned so as to lie in a groove 32 in the hollow axle 8 and the tape roll 5 can rotate together with the pulley 30. A groove 31 of the axle 4 can hold the pin 33 in case the tape reels 2 and 6 are reversed.

Figure 5:
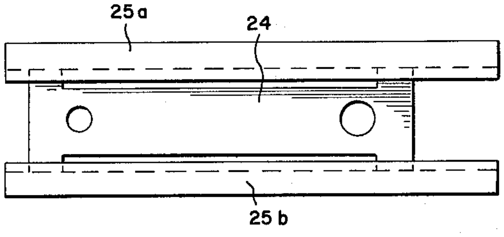
FIG. 5 is a plan view of a sliding plate shown in FIG. 4.
Figure 6:
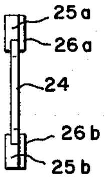
FIG. 6 is an end view of the plate of FIG. 5.

FIG. 5 is a plan view of the sliding plate 24 of FIG. 4 and FIG. 6 is an end view thereof. In FIGS. 5 and 6, the sliding plate 24 is slidably supported by guiding plates 25*a* and 26*a*, and 25*b* and 26*b* fixed to the underside of base plate 21 shown in FIG. 4. Both the guiding plates 25*a* and 25*b* may be constructed by piling up two plates.

Figure 7:
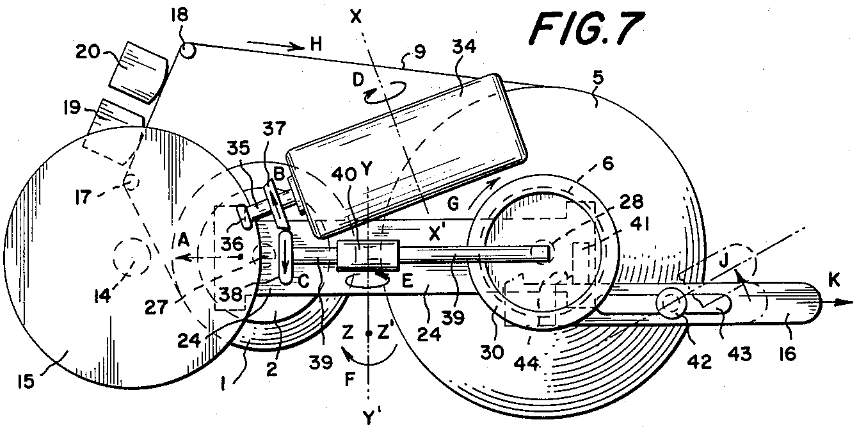
FIG. 7 is a bottom view of a part of the driving mechanism of the tape recorder of FIG. 1.

FIG. 7 is a view from beneath showing the essential parts of the driving mechanism for the tape recorder of FIG. 1. However in order to show easily the relation with FIG. 1, the base plate 21 has been omitted and the parts not related to the driving mechanism, such as the reel carrying frames 10 and 12, are omitted. With the parts in the positions shown in FIG. 1 the apparatus is recording or reproducing, while with the parts in the positions of FIG. 7 the apparatus is rewinding.

Figure 8:
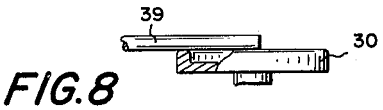
FIG. 8 is a side elevation view, partly in section, of a rewinding pulley and drive shaft therefor.

In FIG. 7, a drive wheel 37 mounted on the shaft 35 of a small D.C. motor 34 is engaged with a drive wheel 38 on the extended shaft 39. The pulley 30 for rewinding has a ring portion 30*a* facing axially of the pulley as shown in FIG. 8 and said shaft 39 engages the face substantially diametrally of pulley 30.

Accordingly, the shaft 39 and the pulley 30 can engage each other regardless of the position of an axle 28.

With the parts in the recording and reproducing positions, the motor 34 is rotatably supported by means (not shown) which include a spring urging the motor in the direction as shown by the arrow D around the axis X–X′ which lies in a plane parallel to the drawing, and a drive wheel 36 mounted on the shaft 35 engages the flywheel 15 on axle 22 of capstan 14.

In the rewinding or non-driving condition, the shaft 35 of the motor 34 is rotated about axis X–X′ and the engagement between the drive wheel 36 and the flywheel 15 is broken.

The link mechanism for rotating the motor is not shown in the drawing but it is connected to the control lever 16.

The shaft 39 is rotatably supported in a bearing 40, and bearing 40 is pivotally mounted by means (not shown) for rotation around the axis Y–Y′ in a plane parallel to a drawing, and axis Z–Z′ in a direction perpendicular to the paper and is urged by springs (not shown) in the directions as shown by the arrows E and F around the axes Y–Y′ and Z–Z′. When this occurs, the drive wheel 37 and the drive wheel 38, and the shaft 39 and the pulley 30 are in driving engagement respectively.

When the parts are in recording and reproducing or non-driving positions, shaft 39 rotates counterclockwise around the axis Z–Z′ and the end engaging the pulley 30 is lifted and thereby the driving engagement is broken.

When the parts are in rewinding positions, the motor 34 and the driving wheel 37 rotates in the directions shown by the arrow B and accordingly the drive wheel 38 and the shaft 39 rotate in the direction shown by the arrow C and the pulley 30 and the supply reel 6 rotate in the direction shown by the arrow G. Consequently the tape part 9 runs in the direction shown by the arrow mark H and the tape roll 1 is rewound.

In the rewinding motion, the drive wheel 38 receives the power to pivot shaft 39 by the rotation of the pulley 37, and the shaft 39 moves against the pulley 30; thus the combination is compact and automatic. Also when the pulley 30 is loaded, the shaft 39 is caused to rotate clockwise around the axis Z–Z′ so that the engagement between the drive wheel 38 and the drive wheel 37 is also compact and automatic.

In the above described rewinding motion, since the axle 28 connected with the reel 6 is driven, even if the tape roll 1 is pressed by the capstan 14 with a force (shown by the arrow mark A) given to the sliding plate 24 by a spring etc., the rewinding of the tape is performed without an increase in the pressing power of the capstan 14 (in other words, the frictional power of the bearing for the capstan 14) in comparison with a rewinding action by driving the periphery of the tape roll 5 as described before.

Also, since this rewinding motion is achieved by driving the axle 28 connected to the tape reel 6, the rotational velocity of the axle 28 can be relatively slow.

It is necessary to minimize the use of electric power of the electric cell in a portable tape recorder utilizing a small D.C. motor as a driving means.

With reference to FIG. 7, the control lever 16 has a guiding slot 43 almost at its center and a hook 44 at its end and is supported by a lever guide 42 mounted on the base plate 21 shown in FIG. 1, and it is movable in a direction parallel to the longitudinal direction of the sliding plate 24. The control lever 16 is positioned as shown in the broken lines when it is pushed into the housing.

Numeral 41 designates a projection provided on the sliding plate 24, and when the control lever 16 is pulled out from the housing in the direction shown by the arrow K, the projection 41 is engaged by a hook 44 on the control lever 16 regardless of the position of the sliding plate 24. Incidentally, when the control lever 16 is pushed into the housing as shown in the broken lines, the projection 41 does not touch the hook 44 regardless of the position of the sliding plate 24. Acordingly, when the control lever 16 is pulled out of the housing, the sliding plate 24 moves toward the right against the aforementioned force A, and accordingly the tape rolls 1 and 5 and the pulley 30 etc. move.

FIG. 7 shows the positions of the parts when the control lever 16 has been pulled out from the housing and the tape on the roll 1 is separated from the capstan 14 and the shaft 39 is positioned so as to be able to engage the pulley 30.

Accordingly, rewinding tape with the parts in these positions is performed smoothly and the use of the electric power of the electric cell is minimized.

In reproducing, the control lever 16 is moved in the direction shown by the arrow J in a position in which it is pushed into a housing. In recording, before the control lever 16 is moved, a recording button (which has a switch for change over from recording and/or reproducing and serves as a button for protecting against erasing the recorded tape erroneously and which is linked with the control lever 16 by a linkage not shown) must be pushed. In both cases, although it is not shown in drawings, only when the control lever 16 has been pushed into the housing, and a projecting part such as a pin placed in the vicinity of its end portion meets with a guide groove extending in a circular arc can the control lever 16 be brought down in the direction shown by the arrow J around the lever guide 42.

By moving the control lever 16 down, the drive wheel 36 of the motor 34 is engaged with the flywheel 15, and the drive wheel 37 and the drive wheel 38, and the shaft 39 and the pulley 30 are respectively disengaged by the linkage as explained above.

At this stage, since the tape roll 1 is engaged by the capstan 14, recording and reproducing are performed by driving the motor 34 as explained with respect to FIG. 1.

The control lever 16 which moves the link mechanism also moves a switch for the motor 34. In case the control lever 16 is pushed into the housing in the position as shown in the broken lines, the tape roll 1 is engaged by the capstan 14 and thereby the rotation of the motor 34 stops. By pivoting the control lever 16, the motor 34 is caused to rotate while the tape roll 1 is being pressed against the capstan 14. By pivoting the control lever 16 back to its former place, rotation of the motor 34 is stopped and, by pulling out the lever 16 the tape roll 1 is separated from the capstan 14 and the motor 34 is rotated. (It is best that the switch for the motor 34 be closed only when the hook 44 touches the projecting part 41 when pulling out the control lever 16.)

The motor 34 is stopped when the control lever 16 is pulled out to an extreme position to permit handling of the tape rolls 1 and 5 easily.

The tape rolls 1 and 5 are placed in rewinding positions by pulling out the control lever 16, while by pushing the control lever 16 in, the projection 41 moves to the left and remains engaged with the hook 44 on the control lever 16 due to the force A on the sliding plate 24. Therefore, the tape roll 1 approaches the capstan 14 while being rewound and when it touches the capstan 14, the switch of the motor 34 is opened. In the meanwhile, since the tape part 9 is always stretched, recording or reproducing can be performed immediately by pushing the lever 16 in and rotating it.

As explained above, all the mechanism of the tape recorder of the present invention can be moved only by the control lever 16.

With reference to FIG. 7, when rewinding the same functions as aforementioned can be obtained by pivoting the control lever 16 in the opposite direction to that necessary for recording and reproducing instead of pulling it out of the housing.

As is obvious from the above explanations, the defects mentioned in connection with prior art recorders are overcome by the present invention and the tape recorder disclosed in the abovementioned application will be improved.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What is claimed is:

1. In a tape recorder having a winding capstan mounted at a fixed point and having a takeup reel and a supply reel both mounted at a fixed distance from each other on a slidable member slidable toward and away from said winding capstan, and a motor means coupled to said winding capstan, the improvement comprising a rewinding pulley adapted to be coupled to said supply reel and move therewith when said slidable member moves and having a ring portion facing axially of said pulley, an elongated shaft extending transversely of the axis of said pulley and substantially diametrally thereof and in frictional engagement with the ring portion of said pulley, and means coupled to the end of said shaft remote from said pulley for connecting said shaft to said motor means, whereby when said pulley moves with said slidable member during rewinding of a tape on said supply reel, said pulley is moved along said shaft while remaining in frictional contact therewith so that the driving connection between the pulley and the shaft is maintained.

2. In a tape recorder having a winding capstan mounted at a fixed point and having a takeup reel and a supply reel both mounted at a fixed distance from each other on a slidable member slidable toward and away from said winding capstan and spring loaded toward the capstan, and a battery driven motor means coupled to said takeup reel, the improvement comprising a control lever mounted on said tape recorder for at least slidable movement in substantially the same direction as the slidable member, a hook means on said control lever adapted to engage with said slidable member, and means coupled to said control lever and said slidable member to prevent operation of said motor means until the hook engages the slidable member, whereby said control lever can be moved in a direction away from said capstan to move said winding reel away from said capstan, and said motor means can be driven to rewind tape on the supply reel only when the control lever has been moved to pull the takeup reel away from the capstan.

3. In a tape recorder having a takeup reel and a winding reel, mounting and braking means for mounting the reels, each comprising a frame having two parallel frame members and a connecting frame member connecting said parallel frame members at one end thereof, bearing means for rotatably mounting the reel, friction discs on said parallel frame members adjacent said bearing means and adapted to bear on the end faces of the reel when it is mounted in the bearing means, and adjustable spacing means mounted between the other ends of the parallel frame members for adjusting the spacing between the said other ends of the parallel frame members for moving the friction discs toward and away from each other, whereby when a reel is mounted in the frame the braking force on the reel can be changed by adjusting the spacing means.

References Cited by the Examiner

UNITED STATES PATENTS 2,804,508 8/1957 Mastling et al. ---- 242—55.13 X

MERVIN STEIN, *Primary Examiner.*